United States Patent [19]

Shinoda et al.

[11] 4,261,659
[45] Apr. 14, 1981

[54] EXPOSURE INDICATOR CONTROL CIRCUIT

[75] Inventors: Nobuhiko Shinoda, Tokyo; Nobuaki Sakurada, Yokohama; Hiroyasu Murakami, Tokyo; Tadashi Ito, Yokohama, all of Japan

[73] Assignee: Canon Kabushiki Kaisha, Tokyo, Japan

[21] Appl. No.: 9,603

[22] Filed: Feb. 5, 1979

[30] Foreign Application Priority Data

Feb. 7, 1978 [JP] Japan ................. 53/12736

[51] Int. Cl.³ .............................. G03B 17/20
[52] U.S. Cl. .................... 354/23 D; 354/53; 354/60 L
[58] Field of Search ............ 354/23 D, 53, 60 A, 354/60 L

[56] References Cited

U.S. PATENT DOCUMENTS

| | | | |
|---|---|---|---|
| 3,872,483 | 3/1975 | Namata et al. | 354/23 D X |
| 4,035,815 | 7/1977 | Takahashi | 354/23 D X |
| 4,092,652 | 5/1978 | Ito et al. | 354/23 D |

Primary Examiner—L. T. Hix
Assistant Examiner—W. J. Brady

Attorney, Agent, or Firm—Toren, McGeady and Stanger

[57] ABSTRACT

In the view-finder of a camera having a TTL type light meter connected to an integrating-type analog-to-digital converter through a repeatedly operated electronic switch, there are positioned fifteen light emitting diodes upon selection of an exposure value by the converter, to illuminate a corresponding indicium on a scale of 15 exposure values, such as shutter times. Since a photocell exposed to scene light is also positioned in the viewfinder, when the brightness of a scene to be photographed is lowered to such an extent that the influence of light from the energized diode on the photo-cell is not negligible, then the decoder for the diode arrangement is controlled to defer initiation of actuation of the one of the diodes which presents the display of an exposure value derived in the preceding cycle of light metering operation pending transition from the light integrating to the analog-to-digital converting step in the following cycle. With the scene brightness above the critical level, a corresponding diode is allowed to light up at the start of each cycle of light metering operation, so that the intensity of illumination on the exposure indicium is increased to make the reading of that indicium easier.

8 Claims, 2 Drawing Figures

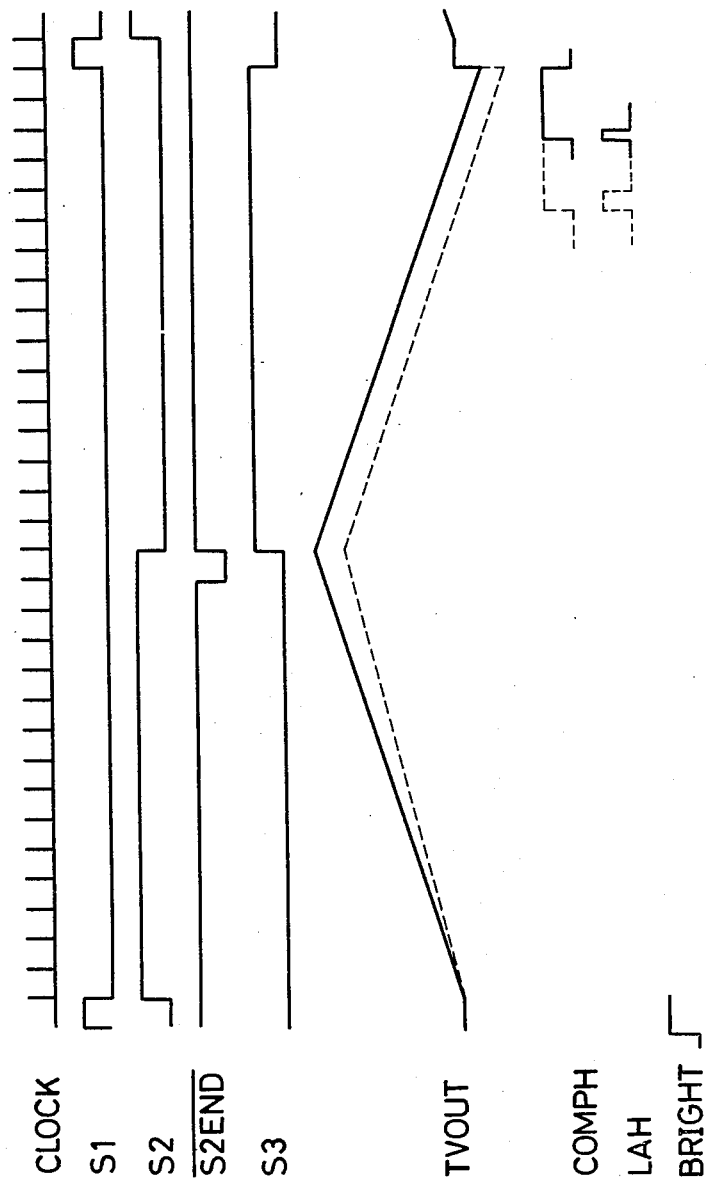

EXPOSURE INDICATOR CONTROL CIRCUIT

BACKGROUND OF THE INVENTION

1. Field of the Invention

This invention relates to exposure indicators in single lens reflex cameras.

2. Description of the Prior Art

It has been known from the art to provide an arrangement of lamps or light emitting diodes (hereinafter referred to as LEDs) for visually indicating exposure values, such as the setting of the diaphragm or the exposure time in the view-finder of a photographic camera. In the case of single lens reflex cameras whose light metering aspect is of the so-called "TTL" type, since it is required that the photo-sensitive element in the finder optical system be exposed to only light entering through the objective lens to avoid any reduction of the accuracy of exposure control, the incorporation of such an LED arrangement into a space adjacent the finder optical system has not been undertaken until a solution has recently been proposed in U.S. Pat. No. 4,035,815. According to this proposal, the actuation of the LED is controlled to light up after the photo-sensitive element is no longer effective to derive the exposure value.

In application of such exposure indicator control circuit to a single lens reflex camera having a digital exposure value computer almost always associated with a repeatedly operated light metering system, it is, however, difficult to enhance the intensity of light from the energized LED, because the period of actuation of each LED is limited to a very short value defined as between the transition from the first to the second half of each cycle of light metering operation and the start of the following cycle. Consequently, when the scene light is very bright, the rapid reading of the exposure indicium becomes almost impossible to achieve, and, therefore, the photographer is unable to determine whether one or more of the adjustable exposure factors are correctly set.

SUMMARY OF THE INVENTION

An object of the present invention is to provide an exposure indicator for use in connection with a repeatedly operated light metering circuit.

Another object of the invention is to provide a control circuit for controlling actuation of the exposure indicator in such a manner that the accuracy of exposure control is not substantially diminished by the use of an arrangement of LEDs in the view-finder and the rapid reading of an exposure indicium illuminated by the LED is assured even when the period of actuation of the LED is halved as from the start of a second half of each cycle of light metering operation to the start of a first half of the following cycle.

Still another object of the invention is to provide a shock-proof digital exposure indicator for a single lens reflex camera.

These and other objects and features of the present invention will become apparent from the following detailed description of a specific embodiment thereof taken in conjunction with the accompanying drawings in which:

BRIEF DESCRIPTION OF THE DRAWINGS

FIG. 2 is a voltage-versus-time chart showing the voltages at various portions of the circuit of FIG. 1 at selected times.

DESCRIPTION OF THE PREFERRED EMBODIMENTS

Figure 1:
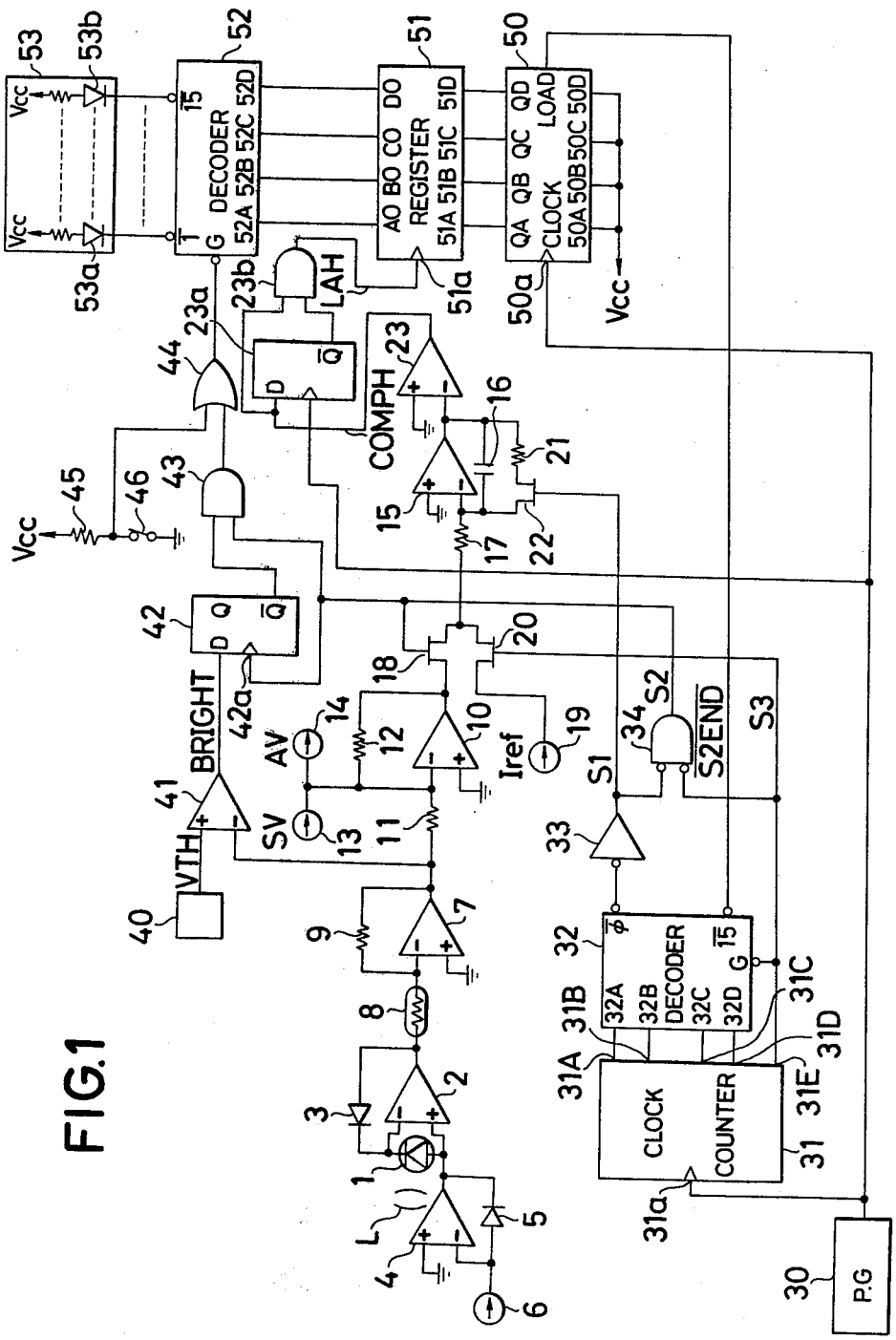
FIG. 1 is an electrical circuit diagram, partly in block form, of an embodiment of an exposure indicator according to the present invention as connected to a digital type automatic exposure value computer.

Referring to FIG. 1, there is shown the circuitry of a single lens reflex camera having an objective lens L. Element 1 is a photo-sensitive element, in this instance, a photo-cell positioned in the view-finder of the camera to receive scene light entering through the objective lens L. The photo-cell 1 generates a voltage proportional to the brightness of a scene to be photographed. This voltage is then compressed logarithmically by an operational amplifier 2 with a feedback diode 3. To compensate for variation with ambient temperature of the output of the light sensing circuit 1, 2, 3, there is provided a bias voltage source composed of an operational amplifier 4, a temperature dependent diode 5 connected in the feedback circuit of the operational amplifier 4, and a constant current source 6 connected to the inversion input of the operational amplifier 6, and a temperature compensation circuit composed of an operational amplifier 7 having an inverting input connected through a temperature dependent element 8 to the output of the light sensing circuit and a resistor 9 connected in the feedback network of the operational amplifier 7. The brightness information from the operational amplifier 7 is combined with film speed and diaphragm aperture information from respective current sources 13 and 14 in an adder circuit which includes a resistor 11 and an operational amplifier 10 with a feedback resistor 12.

An integrating type analog-to-digital converter includes a Miller integrator comprising an operational amplifier 15, a capacitor 16 connected between the output and the inversion input of the operational amplifier 15 and a resistor 17 connected at its one end to the inverting input of the amplifier 15 and, at its opposite end, to the output of the adder circuit 10-12 through a repetitively operated electronic switch in the form of a field effect transistor 18 (hereinafter referred to as an FET) and also to a constant reference current source 19 through a second FET 20. Connected across the integrating capacitor 16 is a series-connected circuit of a resistor 21 and the source-drain path of a third FET 22 to control the charging and discharging operation of the capacitor 16.

The output of the Miller integrator 15-17 is connected to the inverting input of a comparator 23 which has also a non-inverting input connected to the circuit ground so that when the output of the Miller integrator takes a potential of zero and the the comparator 23 changes its output from the low to the high level of logic one (hereinafter referred to as "1"). The output of the comparator 23 is connected to a D type Flip-Flop 23a having an output stage $\bar{Q}$ connected to an AND gate 23b at one input thereof, the opposite input of which is connected to the output of the comparator 23.

A clock pulse generator 30 produces a clock pulse train which is fed to a 5-bit binary counter 31, the D type Flip-Flop 23a and Down counter 50 of 2-scale at their timing inputs 31a, 23a and 50a. The binary counter 31 has five output stages 31A to 31E of the least to the most significant bits respectively of which the first four are connected to respective inputs 32A to 32D of a 4–16 line decoder 32 of known construction. The first counter stage, $\bar{\phi}$, has a binary "0" condition when all the first four outputs of the counter 31 are in the binary "0" conditions and is connected through an inverter 33 to the gate of the third FET 22 and also to a NOR gate 34 at one input thereof, the opposite input of the NOR gate 34 being connected to the most significant bit stage 31E of the binary counter 31 to which are also connected the strobo input of the decoder 32 and the gate of the second FET 20. The gate of the first FET 18 is connected to the output of the NOR gate 34. The down counter 50 has four inputs 50A to 50D connected to a reference voltage source Vcc so that, when the stage $\overline{15}$ of the decoder 32 changes to the binary "0" condition, the Down counter 50 is preset to a [1111] condition. The four output stages QA to QD of the Down counter 50 are connected to respective inputs 51A to 51D of a parallel in-parallel out register 51, the output and input stages QA and 51A being of the least significant bit, the output and input stages QB and 51B being of the second bit, and so forth. The timing input 51a of the register 51 is connected to the output of the AND gate 23b.

An exposure indicator 53 is composed of an arrangement of fifteen light emitting diodes, only two of which are shown at 53a and 53b, in the view-finder of the camera cooperative with a shutter time scale (not shown) to visually indicate exposure values, that is, shutter speeds. The relative position of this arrangement of the photo-cell 1 may be similar to that shown in the aforesaid U.S. Pat. No. 4,035,815 at FIG. 1. The anodes of all the LEDs are connected to a common voltage source Vcc, while the cathodes of the LEDs are connected to the respective output stages $\bar{1}$ to $\overline{15}$ of a 4-16 line decoder 52 having four inputs 52A to 52D connected to the respective outputs AO to DO of the register 51.

To control the operation of the exposure indicator 53 according to whether or not the brightness of the scene is above a critical level, there is provided a control circuit including an adjustable voltage source 40 for producing a reference voltage VTH corresponding to the critical brightness level. The output of the voltage source 40 is connected to a comparator 41 at its non-inverting input, the inverting input of which is connected to the output of the light sensing circuit 1-9. The output of the comparator 41 is connected to a D type Flip-Flop 42 having a timing input connected to the output of the NOR gate 34. The output stage $\bar{Q}$ of the Flip-Flop 42 is connected to an AND gate 43 at one input thereof, the opposite input of which is connected to the output of the NOR gate 34. The output of the AND gate 43 is connected through an OR gate 44 to the strobe input of the decoder 52. Another input of the OR gate 44 is connected to a point on connection between the voltage source Vcc with a resistor 45 and a switch 46 which latter is arranged to be opened when a shutter release button (not shown) is depressed.

The operation of the circuit of FIG. 1 will now be described with reference to the pulse timing chart of FIG. 2. When a main switch (not shown) is thrown, the various circuit portions are supplied with electrical power from a battery (not shown) and the counter 31, register 51 and Flip-Flops 23a and 42 are set in their initial positions. All the outputs 31A to 31E of the counter 31 are, therefore, of "0" level voltage at which the decoder 32 produces "0" and "1" outputs from the stages $\bar{\phi}$ and $\overline{15}$ respectively. Responsive to the "0" output, the inverter 33 changes its output S1 from "0" to "1" as shown on a second line in FIG. 2, causing the third FET 22 to be turned on and therefore causing the Miller integrator 15-17 to produce "0" output voltage TVOUT as shown on a 7th line in FIG. 2.

Now assuming that the scene light is less bright, then the output of the light sensing circuit 1-9 takes a higher voltage than the reference voltage VTH from the voltage source 40 and therefore the comparator 41 produces an output voltage BRIGHT of "0" level. Upon advent of a first pulse on the timing input of the counter 31, the least significant bit (hereinafter referred to as "LSB") at 31A changes to "1" by which the output $\bar{\phi}$ of the decoder 32 is changed to "1" level, causing the output S1 of the inverter 33 to return to "0" as shown on the 2nd line in FIG. 2. Since the most significant bit (hereinafter referred to as "MSB") of the counter 31 remains at "1", the output S2 of the NOR gate 34 changes to "1" at which the first FET 18 is turned on to apply the output of the adder circuit 10-12 to the Miller integrator 15-17 while the third FET 22 is simultaneously turned off. Thus, a first cycle of light metering operation starts as the integrating capacitor 16 is gradually charged as shown by a dashed line in FIG. 2.

Such change of the output S2 of NOR gate 34 to "1" also causes the AND gate 43 to be gated on so that the "0" output BRIGHT of the comparator 41 plays a role in de-actuating the decoder 52 despite what content the register 51 has, since the "1" output $\bar{Q}$ of the Flip-Flop 42 is applied through the AND gate 43 and the OR gate 44 to the strobe input G of the decoder 52. Thus, any one of the LEDs 53a-53b does not light up and therefore the operator looking through the finder can not perceive any indication representative of an effective shutter time except for an image of the scene to be photographed.

At a time when the clock pulse generator 30 produces a 15th pulse, of the first four output stages 31A to 31D of the counter 31 take on "1" conditions, and therefore the decoder 32 changes its output $\overline{S2END}$ to "0" which is fed to the input LOAD of the down counter 50 so that all the output stages QA to QD of the down counter 50 take on "1" conditions, as shown on a 4th line in FIG. 2. Upon advent of the next or 16th pulse on the counter 31, the MSB becomes "1" as shown on a 5th line S2 in FIG. 2, and the output S2 of NOR gate 34 is changed to "0" again, causing non-conduction of the first FET 18 to cut off the adder circuit 10-12 from the Miller integrator 15-17 and also causing conduction of the second FET 20 to start discharging of the capacitor 16 through the resistor 17 and FET 20. Thus, the second half of the first cycle of light metering operation starts to convert the analog output of the exposure value computer 1-12 to a digital value. It is to be noted here that the 16th pulse causes the NOR gate 34 to change its output S2 to "0" level at which the AND gate 43 is gated off to render the decoder 52 operative, but any one of the LEDs 53a-53b is not driven to light up as their cathodes are supplied with "1" voltage because of the lack of the latched content of the register 51 until the analog-to-digital convertion is completed.

While the capacitor 16 is being discharged, the counter 50 counts down a clock pulse train beginning with the 17th pulse so that the content of the counter 50 retreats successively from the binary word [1111]. Assuming again that the analog output of the computer 10-12 was representative of 1/250 sec. in shutter time, then the output voltage TVOUT of the Miller integrator 15-17 reaches zero at a time between the 27th and 28th pulses, and the comparator 23 changes its output COMPH to a "1" level as shown by a dashed line in FIG. 2. Therefore the output LAH of the AND gate 23b changes to a "1" as shown by a dashed line in FIG. 2 at which the register 51 is latched in the binary word [0100] condition. From this time onward, the one of the LEDs 53a–53b which is connected to the output stage $\overline{4}$ of the decoder 52 gives off light with which an exposure indicium representative of 1/250 sec. on the shutter time scale is illuminated so as to be visible by the operator looking through the finder. It is noted here that the content of the down counter 50 continues to change, but the exposure indication remains unchanged because the next or 28th pulse inverts the flip-flop 23a of with change of the output LAH of the AND gate 23b to "0" level.

When a 32nd pulse is produced from the generator 30, all the output stages 31A to 31E of the counter 31 are reset to the [00000] condition where the output S1 of the inverter 33 is again at "1" level. Therefore, the output voltage TVOUT of the Miller integrator 15–17 is suddenly increased from a negative value to zero. The 32nd pulse further causes the second FET 20 to be reset to the non-conducting state. Thus, the first cycle of light metering is completed, which lasts for a time of about 10 milliseconds.

During a first half of a second cycle which begins with a 33rd pulse and terminates at a 48th pulse, the decoder 52 remains de-actuated by the control circuit 40–44 so that no exposure indication is presented to avoid disturbance of the light sensing action of the photo-cell 1. After the counter 50 is reset to the initial [1111] condition by the "0" output $\overline{S2END}$ of the decoder 32 at the time of occurrence of the 47th pulse, a second half of the second cycle of light metering operation starts with the 48th pulse while permitting the same digital value of shutter time as that derived in the first cycle to be presented. As the discharging of the capacitor 16 proceeds, the output TVOUT of the Miller integrator 15–17 reaches zero at which the exposure indication is renewed provided that the scene light is different in intensity. Thus, the control circuit 40–44 causes the exposure indicator 53 to intermittently operate so that the photo-cell 1 is not influenced by the otherwise produced light from the indicator 53 when the scene light is less bright.

Alternately assuming that the scene light is very bright, then the output BRIGHT of the comparator 41 takes on a "1" level at the time of closure of the main switch as shown on the bottom line in FIG. 2. Although the first pulse causes the AND gate 43 to change its output to "0" by which the decoder 52 is actuated, any digital value of shutter time can not be viewed in the finder because the content of the register 51 is [1111] for which there is provided no light emitting diode in the indicator 53. A voltage ramp is derived from the Miller integrator 15–17, the slope of which is steeper than when the scene light is less bright as it is a function of scene brightness as shown by a solid line on the line denoted by TVOUT. In the second half of the light metering cycle, therefore, the voltage TVOUT reaches zero at a later time, for example, between the 29th and 30th pulses corresponding to 1/1000 sec. in shutter time. Thus, the second LED counting from the left is caused to light up.

At the transition from the first to the second cycle of light metering operation, the change of the output S2 of the NOR gate 34 to "1" level by the 33rd pulse does not lead to interrupt the presentation of the exposure indication because the "1" output of the comparator 41 is fed to the flip-flop 42 and the strobe input of the decoder 52 is maintained at "0" potential. In other words, even when the photo-cell 1 is effective to contribute to derivation of an exposure value, the exposure indicator 53 is allowed to give off light and even more so with increased intensity of the light. When a latching signal LAH is produced from the AND gate 23b, the content of the register 51 is renewed. If the new content of the register 51 is the same as the preceding one, the second LED continues to light up past a time between the occurrences of 61st and 62nd pulses. Accordingly, the rapid reading of the exposure indicium, in this instance, 1/1000 can be enjoyed by the operator despite the fact that a very bright image of the scene appears adjacent the indicium.

Such procedure repeats itself until a shutter button (not shown) is depressed to open the normally closed switch 46. The opening of the switch 46 causes a "1" potential to appear at the strobe input G of the decoder 52. Thus, the exposure indicator 53 does not operate during the time when a film (not shown) is exposed.

It will be appreciated from the foregoing that the present invention provides an exposure indicating device for use in connection with a recycle type automatic exposure control system which enables the operator to determine whether or not the preselected value of diaphragm aperture is correctly set, as the case may be. Although the exposure indication can not be viewed at the very start of the camera operation, this blank of exposure indication does not exceed 10 milliseconds and may be considered to be negligible from the standpoint of accurate reading. The advantage that the exposure indicator of the invention gives the operator a clear image of the exposure indicium, even when the image of the scene is very bright as these images are positioned adjacent to each other, is not prejudiced by a disadvantage that the light from the exposure indicator influences the photo-cell because the intensity of indicator light on the image-receiving surface of the photo-cell is negligibly smaller than that of the image of the scene directly incident thereon.

What is claimed is:

1. An exposure indicating device for a camera comprising:
    (a) light measuring means for recyclically measuring the brightness of an object to be photographed to produce an electrical signal corresponding to the object brightness measured, said light measuring means having a first interval which produces the electrical signal corresponding to the brightness and a second interval which produces the electrical signal relative to the electrical signal generated by the first interval;
    (b) indicating means for indicating an exposure value corresponding to the electrical signal from said light measuring means;
    (c) brightness level discriminating means responsive to the condition of the object brightness exceeding a predetermined level for producing an indication control signal; and
    (d) control means connected between said brightness level discriminating means and said indicating means and responsive to said indication control signal for rendering inoperative said indicating means in the first interval when the object brightness is lowered below a predetermined level and for rendering operative said indicating means in the first and second intervals when the object brightness exceeds said predetermined level.

2. An exposure indicating device according to claim 1, wherein said brightness level discriminating means includes a reference voltage source for producing a predetermined voltage corresponding to the visibility of the exposure indication, and a comparator having two inputs one of which is connected to the output of said reference voltage source and another input which is connected to said light measuring means, whereby when the output of said light measuring means is higher than that of said reference voltage source, said indication control signal is produced.

3. An exposure indicating device according to claim 2, wherein said light measuring means includes at least a photo-electric element.

4. An exposure indicating device according to claim 3, wherein said comparator is connected at one of said inputs to said photo-electric element.

5. An exposure indicating device according to claim 4, wherein said photo-electric element comprises a photo-cell.

6. An exposure indicating device according to claim 1, wherein said indicating means includes a plurality of light emitting diodes corresponding to exposure information.

7. An exposure indicating device for a camera comprising:
   (a) light measuring means for recyclically measuring the brightness of an object to be photographed to produce an electrical signal corresponding to the object brightness measured, said light measuring means having a first interval which produces the electrical signal corresponding to the brightness and a second interval which produces the electrical signal relative to the electrical signal generated by the first interval;
   (b) a register for producing a digital signal corresponding to the electrical signal from said light measuring means;
   (c) an encoder having a strobe input and connected with the output of said register to produce exposure parameter signals corresponding to the digital signal from said register;
   (d) indicating means connected to said encoder for indicating exposure information corresponding to the exposure parameter signal from said encoder;
   (e) brightness level discriminating means responsive to the exceeding of the object brightness above a predetermined level for producing an indication control signal; and
   (f) control means connected to said strobe input of said encoder and responsive to said indication control signal for rendering inoperative said indicating means in the first interval when the object brightness is lowered below a predetermined level and for rendering operative said indicating means in the first and second intervals when the object brightness exceeds said predetermined level.

8. An exposure indicating device according to claim 7, wherein said brightness level discriminating means includes a reference voltage source for producing a predetermined voltage corresponding to the visibility of the exposure indication, and a comparator having two inputs, one of which is connected to the output of said reference voltage source and another input which is connected to said light measuring means, whereby when the output of said light measuring means is higher than that of said reference voltage source, said indication control signal is produced.

* * * * *